(12) United States Patent
Khan et al.

(10) Patent No.: US 10,050,475 B2
(45) Date of Patent: Aug. 14, 2018

(54) HELICAL ANTENNA WIRELESS POWER TRANSFER SYSTEM

(71) Applicant: Kansas State University Research Foundation, Manhattan, KS (US)

(72) Inventors: Saeed M. Khan, Manhattan, KS (US); Nathan Maresch, New Cambria, KS (US); Justin Kuntz, Abilene, KS (US)

(73) Assignee: Kansas State University Research Foundation, Manhattan, KS (US)

( * ) Notice: Subject to any disclaimer, the term of this patent is extended or adjusted under 35 U.S.C. 154(b) by 255 days.

(21) Appl. No.: 14/891,166

(22) PCT Filed: May 19, 2014

(86) PCT No.: PCT/US2014/038616
§ 371 (c)(1),
(2) Date: Nov. 13, 2015

(87) PCT Pub. No.: WO2015/026410
PCT Pub. Date: Feb. 26, 2015

(65) Prior Publication Data
US 2016/0156230 A1 Jun. 2, 2016

Related U.S. Application Data

(60) Provisional application No. 61/825,373, filed on May 20, 2013.

(51) Int. Cl.
*H01F 38/00* (2006.01)
*H02J 50/12* (2016.01)
(Continued)

(52) U.S. Cl.
CPC ............... *H02J 50/12* (2016.02); *H01Q 1/32* (2013.01); *H01Q 1/362* (2013.01); *H01Q 11/08* (2013.01); *H02J 7/025* (2013.01); *H02J 50/40* (2016.02); *H02J 50/90* (2016.02); *H04B 5/0037* (2013.01); *H04B 5/0093* (2013.01); *H02J 5/005* (2013.01); *H02J 17/00* (2013.01)

(58) Field of Classification Search
CPC ............ H02J 5/005; H02J 17/00; H02J 50/12
USPC ........................................................ 307/104
See application file for complete search history.

(56) References Cited

U.S. PATENT DOCUMENTS 6,011,524 A 1/2000 Jervis
7,286,099 B1 10/2007 Lier et al.
(Continued)

OTHER PUBLICATIONS

The International Search Report and Written Opinion dated Apr. 7, 2015, in PCT/US14/38616, filed May 19, 2014.

*Primary Examiner* — Alfonso Perez Borroto
(74) *Attorney, Agent, or Firm* — Hovey Williams LLP (57) ABSTRACT

A wireless power transfer system including a transmitting antenna with a first conductive helix wound about a first helical axis, and a first ground plane positioned adjacent to and angled orthogonally with the first helical axis. The wireless power transfer system additionally includes a receiving antenna with a second conductive helix wound about a second helical axis, and a second ground plane positioned adjacent to and angled orthogonally with the second helical axis. Furthermore, the wireless power transfer system further includes a conductive material connecting the first ground plane to the second ground plane.

21 Claims, 6 Drawing Sheets

(51) Int. Cl.
    *H02J 7/02*         (2016.01)
    *H02J 50/90*       (2016.01)
    *H02J 50/40*       (2016.01)
    *H01Q 1/32*        (2006.01)
    *H01Q 11/08*      (2006.01)
    *H01Q 1/36*        (2006.01)
    *H04B 5/00*        (2006.01)
    *H02J 5/00*         (2016.01)
    *H02J 17/00*       (2006.01)

(56) References Cited

U.S. PATENT DOCUMENTS

8,144,066 B2 *   3/2012   Parsche ................ H01Q 1/2208
                                                                 343/702
2008/0094307 A1 *   4/2008   Cowles .................... H01Q 1/08
                                                                  343/895

* cited by examiner

HELICAL ANTENNA WIRELESS POWER TRANSFER SYSTEM

RELATED APPLICATIONS

The present application is a national stage application under 35 U.S.C. § 371 of International Application No. PCT.US14/38616, filed May 19, 2014, which claims the benefit of U.S. Provisional Patent Application No. 61/825,373 filed May 20, 2013, and entitled "HELICAL ANTENNA GROUND PLANE COMBINATION FOR HIGHLY EFFICIENT NEAR FIELD RESONANT WIRELESS POWER TRANSFER SYSTEM," which is incorporated by reference herein in its entirety.

STATEMENT REGARDING FEDERALLY SPONSORED RESEARCH

This invention was made with U.S. Government support under grant number FA9550-10-1-0245 awarded by the Air Force Office of Scientific Research and the Department of Defense. The government has certain rights in the invention.

BACKGROUND OF THE INVENTION

Field of the Invention

Embodiments of the present invention are directed to a wireless power transfer system. More specifically, embodiments of the present invention are directed to systems and methods for wirelessly transmitting power via helical antennas using near-field electromagnetic transmissions.

Description of the Prior Art

Given the prevalence of electrically-powered devices, a significant hurdle to the widespread use of such devices is the ability to provide electrical power on demand. Typically, electrically-powered devices will include energy storage devices, such as batteries, for providing power to the devices. Nevertheless, batteries will lose their charge over time, thus, making the devices inoperable until the batteries can be recharged. The requirement for charging a battery is itself problematic, as standard charging processes generally require a hard-wire connection between the battery and a charging source (e.g., power-grid, generator, alternator, etc.). Such hard-wire connections require consideration of the extensive costs of materials (e.g., power cables, connectors, etc.), the weight of materials, and the space required for placement of the materials.

Numerous studies have been conducted in attempts to wirelessly transfer power between electromagnetically-coupled antennas. Most studies have focused on transferring power through use of far-field radiation (i.e., plane-wave radiation). In particular, a transmitting antenna will transmit far-field radiation to a receiving antenna that collects the radiation to use as electrical power. However, such fair-field radiation transmissions suffer from the significant problem of the radiation's strength and/or magnitude reducing exponentially with distance. Such a reduction in radiation strength significantly affects the efficiencies of such wireless power transfer methods.

Thus, what is needed is a way to transmit electrical power wirelessly, so as to avoid the need for hard-wire connections between electrically-powered devices and power sources. Furthermore, what is needed is a way to transmit electrical power wirelessly in a manner than maintains sufficient efficiency so as to make wireless transfer of power practically and economically feasible.

SUMMARY OF THE INVENTION

According to one embodiment of the present invention there is provided a wireless power transfer system comprising a transmitting antenna including a first conductive helix wound about a first helical axis, and a first ground plane positioned adjacent to and angled generally orthogonally with the first helical axis. The wireless power transfer system additionally comprises a receiving antenna including a second conductive helix wound about a second helical axis, and a second ground plane positioned adjacent to and angled generally orthogonally with the second helical axis. The wireless power transfer system further comprises a conductive material connecting the first ground plane to the second ground plane.

According to another embodiment of the present invention there is provided an additional wireless power transfer system comprising a transmitting antenna including a first conductive helix wound about a first helical axis, a first ground plane positioned adjacent to and angled generally orthogonally with the first helical axis, and a first conductive material connecting the first conductive helix to the first ground plane. The additional wireless power transfer system also comprises a receiving antenna including a second conductive helix wound about a second helical axis, a second ground plane positioned adjacent to and angled generally orthogonally with the second helical axis, and a second conductive material connecting the second conductive helix to the second ground plane.

According to another embodiment of the present invention there is provided a method of wirelessly transferring electrical power between a transmitting and a receiving antenna, with each of the antennas including a conductive helix wound about a helical axis and with each including a ground plane. The method includes the initial step of positioning the receiving antenna within a non-radiative near field of the transmitting antenna. A next step includes orientating the antennas such that the helical axes of the antennas are offset from parallel by no more than 30 degrees. A next step includes providing an electrical connection between the ground planes of the antennas, and a final step includes causing the transmitting antenna to transmit an electromagnetic signal at a resonant frequency of the transmitting antenna.

According to still another embodiment of the present invention there is provided an additional method of wirelessly transferring electrical power between a transmitting antenna and a receiving antenna, with each of the antennas including a conductive helix wound about a helical axis and with each including a ground plane. The method includes the initial step of positioning the receiving antenna within a non-radiative near field of the transmitting antenna. A next step includes orientating the antennas such that the helical axes of the antennas have an angular misalignment of no more than 30 degrees from collinear. A next step includes providing an electrical connection between the conductive helix of the transmitting antenna and the ground plane of the transmitting antenna. Next, an electrical connection is provided between the conductive helix of the receiving antenna and the ground plane of the receiving antenna. A final step includes causing the transmitting antenna to transmit an electromagnetic signal at a resonant frequency of the transmitting antenna.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWINGS

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENT

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 1:
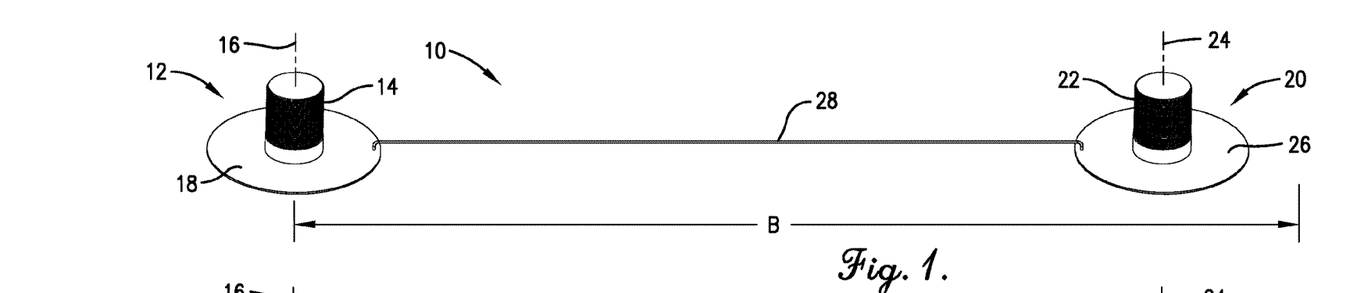
FIG. 1 is a perspective view of a wireless power transfer system according to an embodiment of the present invention, with the system including a transmitting antenna and a receiving antenna.
Figure 2:
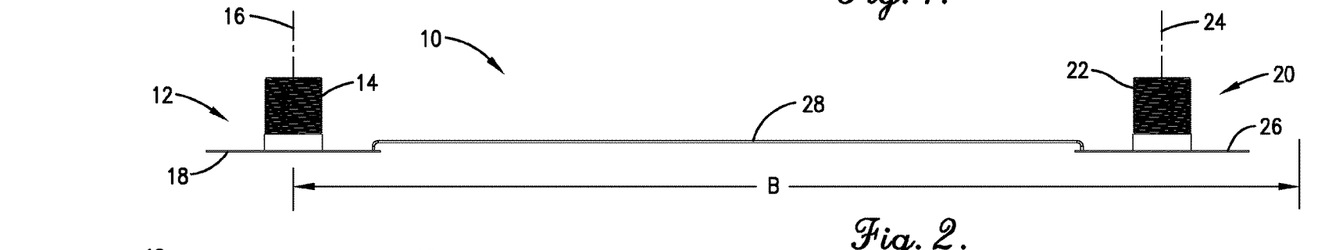
FIG. 2 is a side elevational view of the wireless power transfer system of FIG. 1.
Figure 3:
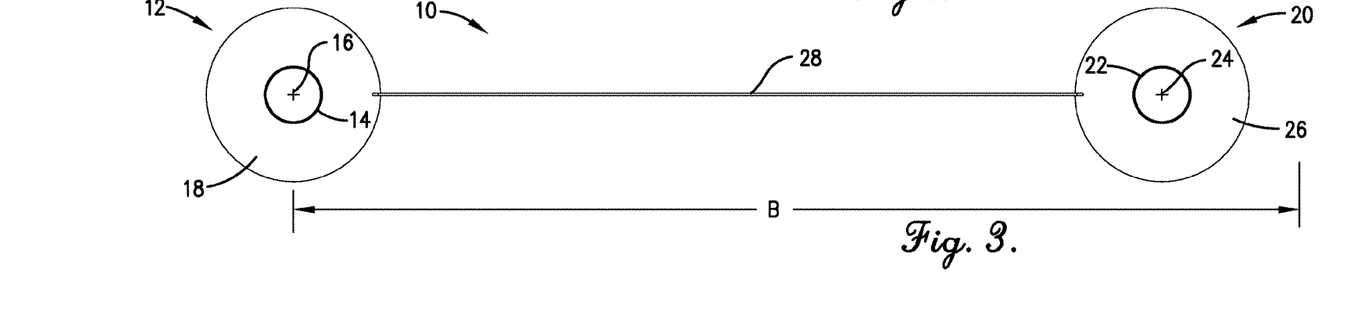
FIG. 3 is a plan view of the wireless power transfer system of FIGS. 1-2.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein As illustrated in FIGS. 1-3, embodiments of the present invention include a wireless power transfer system 10 broadly comprising a transmitting antenna 12 including a first conductive helix 14 wound about a first helical axis 16 and a first ground plane 18 positioned adjacent to and angled generally orthogonally with the first helical axis 16, a receiving antenna 20 including a second conductive helix 22 wound about a second helical axis 24 and a second ground plane 26 positioned adjacent to and angled generally orthogonally with the second helical axis 24, and a conductive material 28 connecting the first ground plane 18 to the second ground plane 26. In such a configuration, the power transfer system 10 of embodiments of the present invention is configured to wireless transmit electromagnetic power from the transmitting antenna 12 to the receiving antenna 20.

Figure 4:
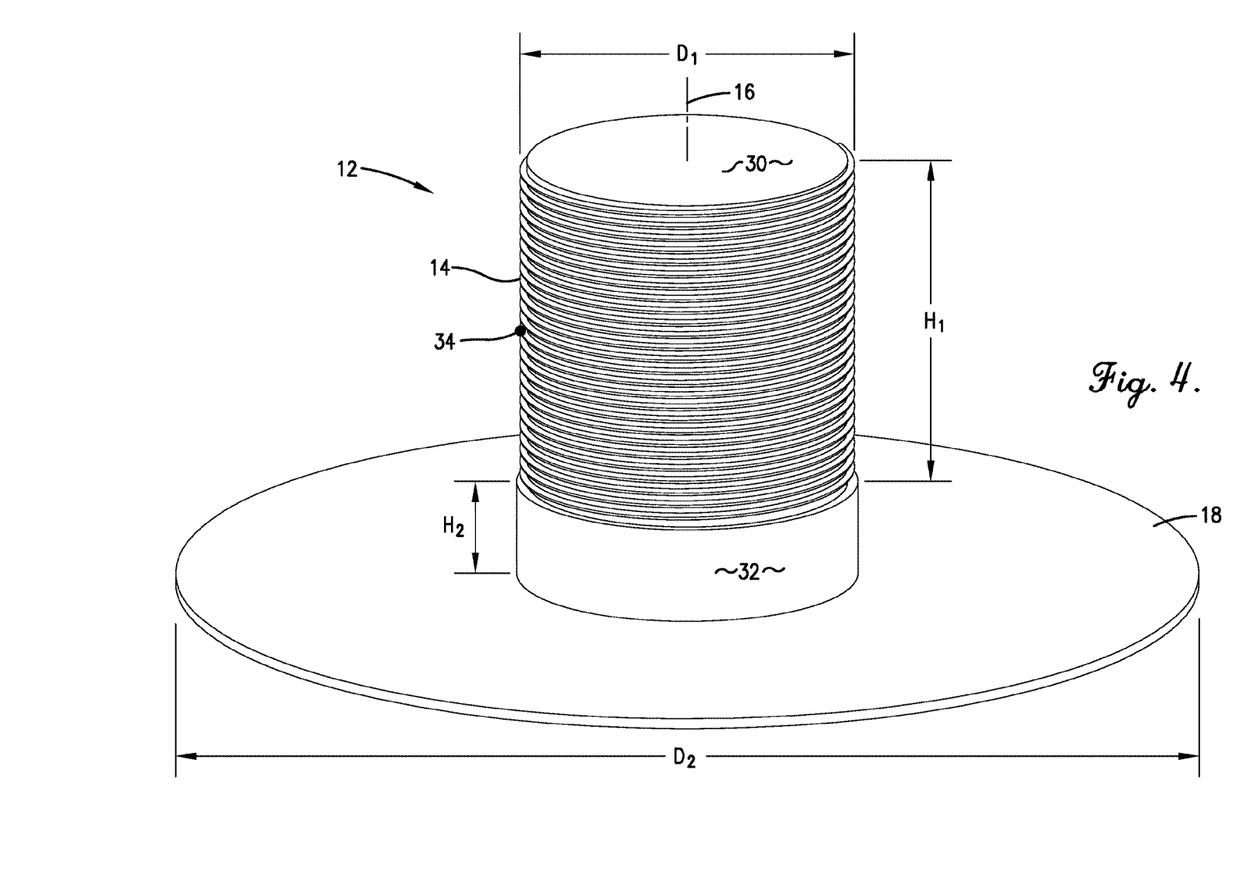
FIG. 4 is a perspective view of the transmitting antenna from the wireless power transfer system of FIGS. 1-3.

In more detail, FIG. 4 is illustrative of the transmitting antenna 12 from the power transfer system 10. The first conductive helix 14 is formed from a conductive material, such as a metal wire, wound about the first helical axis 16. In certain embodiments, the first conductive helix 12 will be wound generally equidistant about the first helical axis 16, with the first helical axis 16 being generally centrally-located with respect to the transmitting antenna 12. Embodiments of the present invention provide for a number of turns of the first conductive helix 14 to vary so as to adjust a resonant frequency of the transmitting antenna 12. With reference to the transmitting antenna 12 illustrated in the FIG. 4, the antenna 12 includes 26 right-hand wound turns. Each adjacent turn is separated by a distance (i.e., a pitch), such that a total height H1 of the first conductive helix 14 is generally defined as distance between an uppermost portion and a lowermost portion of the first conductive helix 14, including a sum of pitches and turn thicknesses there between. Furthermore, for embodiments in which the first conductive helix 14 outlines a generally cylindrical shape, the turns of the first conductive helix 14 present a diameter D1. In other embodiments, such as when the first conductive helix 14 outlines a different shape, such as a conical shape, the diameter of the first conductive helix 14 may vary along the first conductive helix's 14 height.

In some embodiments, a support material 30 may be positioned within an interior of the wound first conductive helix 14, such that the first conductive helix 14 wraps around and is partially supported by the support material 30. In such embodiments, it may be preferred that the support material 30 be formed from a material having a sufficiently small dielectric constant, such as plastic, resin, fiberglass, or the like, such that the support material 30 will not interfere with the functionality of the transmitting antenna 12. Nonetheless, if a support material 30 is used, considerations may be taken for determining a resonant frequency of the transmitting antenna 12.

The first ground plane 18 may formed from a conductive material such as a metal plate. The first ground plane 18 may be positioned adjacent to the conductive helix 14. In some embodiments, the first ground plane 18 may be positioned orthogonally with respect to the first helical axis 16. However, in other embodiments, the first ground plane 18 may be positioned at an angle no more than 5 degrees, 15 degrees, 30 degrees, or 45 degrees offset from orthogonal with the first helical axis 16. Additionally, embodiments of the present invention may provide for the ground plane 18 to be formed in various sizes and shapes. For example, the ground plane 18 may have a diameter that is at least 1.5, at least 2, at least 3, at least 5, or more times the height H1 of the first conductive helix 14. Additionally, the ground plane 18 may be formed in various shapes, such as rectangular, square, polygonal, or circular. Nevertheless, in certain embodiments, it may be preferable for the ground plane 18 to be circular in shape because symmetrical boundaries provided by the ground plane's 18 circular shape will reduce generation of unwanted higher order modes.

As shown in FIG. 4, in some embodiments, the first conductive helix 14 and the first ground plane 18 may be set apart by a separating distance H2. In certain embodiments, the first conductive helix 14 and the first ground plane 18 may be set apart by a separating material 32. As with the supporting material 30, it may be preferred for the separating material 32 to be formed from a material having a sufficiently small dielectric constant, such as plastic, resin, fiberglass, or the like, so as to not interfere with the functionality of the transmitting antenna 12. Nonetheless, if a separating material 32 is used, considerations may be taken as to determining the resonant frequency of the transmitting antenna 12. In some embodiments, the separating distance H2 may vary as required by specific constraints or requirements of the transmitting antenna 12. For example, in some embodiments, the distance H2 may be no more than ⅛, ¼, ⅓, or ½ the height H1 of the first conductive helix 14.

Embodiments of the present invention provide for the transmitting antenna 12 to further include an electrical connection in the form of a feedpoint 34 where an input signal can be introduced to the transmitting antenna 12 for transmission to the receiving antenna 20. Certain embodiments may provide for the feedpoint 34 to be positioned anywhere on along the first conductive helix 14. Nevertheless, in some embodiments, such as illustrated in FIG. 4, the feedpoint 34 will be at a point on the first conductive helix 14 that is generally adjacent to a midpoint of the first conductive helix's 14 height H1.

In some embodiments, the receiving antenna 20 will be formed structurally similar to, or identical as, the transmitting antenna 12. As such, the second conductive helix 22 and the second ground plane 26 will be formed the same as the first conductive helix 14 and the first ground plane 18, with each having similar sizes, shapes, and material compositions. Additionally, if the transmitting antenna 12 includes supporting and separating materials 30, 32, the receiving antenna 20 may similarly include the same supporting and separating materials 30, 32. With the receiving antenna 20 being constructed identical to the transmitting antenna 12, the antennas 12, 20 will have similar, or identical, resonant frequencies, which may facilitate wireless transmission of power, especially when the electromagnetic energy transmitted by the transmitting antenna 12 is transmitted at the resonant frequency of the antennas 12, 20.

To facilitate the wireless power transmission of the wireless power transfer system 10, embodiments of the present invention provide for the receiving antenna 20 to be positioned within a non-radiative near field of the transmitting antenna 12. As shown in FIGS. 1-3, for helical-type, sub-wavelength antennas, such as the transmitting and receiving antennas 12, 20, the non-radiative near field may be defined as a region bounded by a distance B, where the distance B is calculated by a resonant wavelength λ of the transmitting antenna 12 divided by two times pi (i.e., λ/2π). Once the receiving antenna 20 is positioned within the nonradiative near field, embodiments of the present invention provide for the transmitting and receiving antennas 12, 20 to be positioned in a plurality of configurations and orientations so as to enhance the wireless power transmission capabilities of the antennas 12, 20.

For example, returning to the wireless power transfer system 10, as illustrated in FIGS. 1-3, the transmitting and receiving antennas 12, 20 may have their respective ground planes 18, 26 connected via the conductive material 28. In some embodiments, the conductive material 28 may be a small, metal ground wire. However, in other embodiments, the conductive material 28 may be a strip of conductive material. In still other embodiments, the conductive material 28 may be a large, conductive surface. For example, as will be discussed in more detail below, each of the transmitting and receiving antennas 12, 20 may be positioned on a conductive surface, such that the ground planes 18, 26 of the antennas 12, 20 are electrically coupled via the conductive surface.

Remaining with FIGS. 1-3, embodiments may provide for the transmitting and receiving antennas 12, 20 to be orientated such that their respective helical axes 16, 24 are generally parallel. However, in other embodiments, the helical axes 16, 24 may not be precisely parallel. For example, in some embodiments, the helical axes 16, 24 may be offset from parallel by no more than 5 degrees, 15 degrees, 30 degrees, 45 degrees, or 90 degrees with respect to each other. However, in other embodiments, the helical axes 16, 24 may be offset by as much as 180 degrees. In such embodiments, the helical axes 16, 24 may be collinear, with the uppermost portions of the first and second conductive helixes 14, 22 facing each other.

Figure 5:
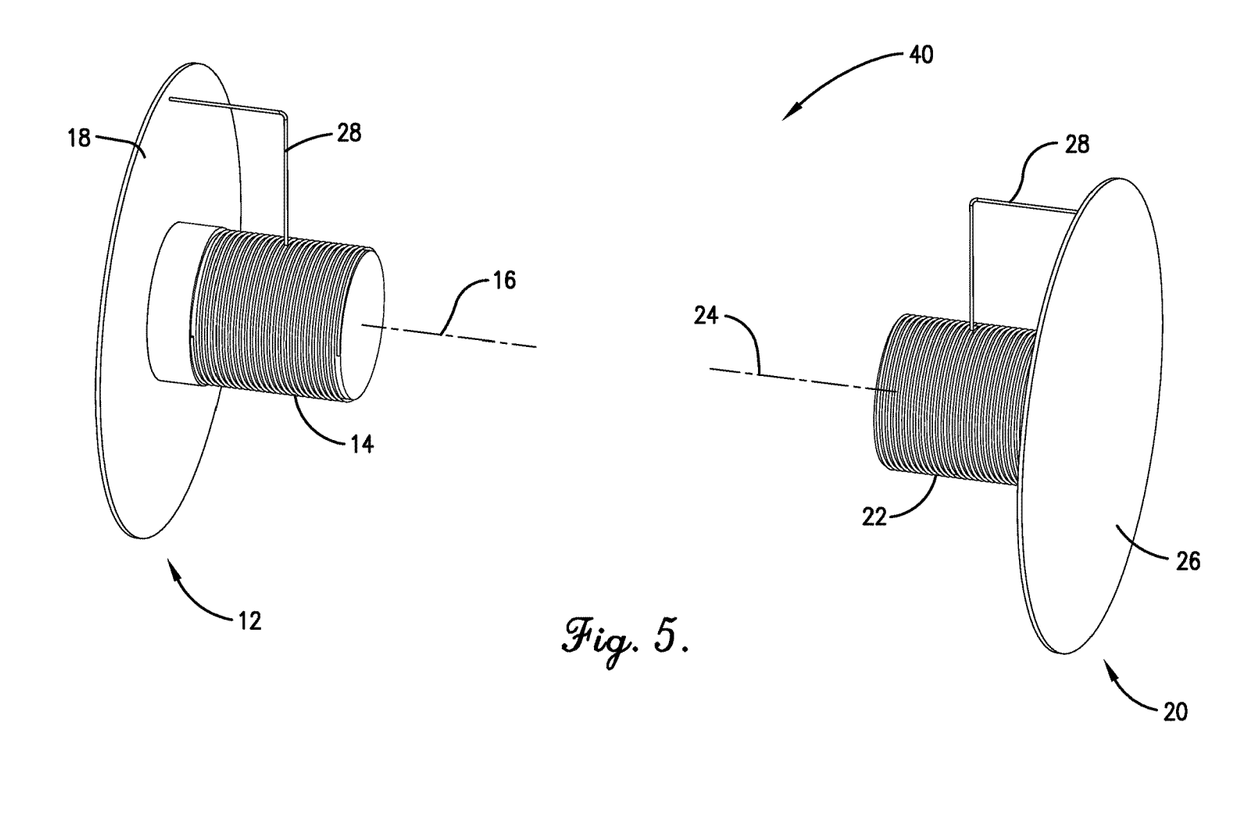
FIG. 5 is a perspective view of an additional wireless power transfer system according to an additional embodiment of the present invention, with the system including a transmitting antenna and a receiving antenna.

As an illustration of additional embodiments of the present invention, FIG. 5 illustrates an additional wireless power transfer system 40 that similarly includes transmitting and receiving antennas 12, 20. In contrast to the wireless power transfer system 10 of FIGS. 1-3, the wireless power transfer system 40 does not include a conductive material 28 connecting the ground planes 18, 26 of the transmitting and receiving antennas 12, 20. As such, wireless power transfer system 40 may be used in instances where it is impractical or impossible to physically connect the transmitting and receiving antennas 12, 20. Instead, as shown in FIG. 5, each of the transmitting and receiving antennas 12, 20 may include a conductive material 28 that connects each of the antennas' 12, 20 conductive helix 14, 22 to its respective ground plane 18, 26. In some embodiments, the conductive material 28 may connect to each of the antennas' 12, 20 conductive helix 14, 22 at a midpoint of the conductive helix's 14, 20 height H1 (e.g., see FIG. 4), such that the conductive materials 28 are connected at the feedpoints 34 (e.g., see FIG. 4) of the conductive helixes 14, 22. The conductive material 28 may comprise a metal wire, a metal strip, or other form of conductive material.

Remaining with the wireless power transfer system 40 of FIG. 5, embodiments may provide for the transmitting and receiving antennas 12, 20 to be orientated such that their respective helical axes 16, 24 are generally collinear, with the uppermost portions of the conductive helixes 14, 22 facing each other. However, in other embodiments, the helical axes 16, 24 may not be exactly collinear. For example, in some embodiments, the helical axes 16, 24 may have an angular misalignment of no more than 5 degrees, 15 degrees, 30 degrees, 45 degrees, or 90 degrees with respect to each other. However, in other embodiments, the helical axes 16, 24 may be misaligned by up to 180 degrees, such that the helical axes are parallel. Furthermore, in some embodiments, the helical axes 16, 24 may be misaligned by more than 180 degrees.

Given the wireless power transfer systems 10, 40 described above, embodiments of the present invention are operable to wirelessly transfer power between the transmitting antenna 12 and the receiving antenna 20. Initially, whether implementing wireless power transfer system 10 or wireless power transfer system 40, the receiving antenna 20 should be positioned within the non-radiative near field of the transmitting antenna 12. Subsequently, the transmitting antenna 12 should be excited by applying an oscillating electromagnetic input signal at the feedpoint 34 of the first conductive helix 14. In certain embodiments, the oscillating input signal should be provided at the resonant frequency of the transmitting and receiving antennas 12, 20. As an illustrative example, in some embodiments the resonant frequency will be between 10-50 MHz. In other embodiments, the resonant frequency may be between 2.4-2.5 GHz. Nevertheless, an oscillating magnetic field is generated via the first conductive helix 14, such that oscillating electromagnetic radiation is generated, which can be received via the second conductive helix 22 of the receiving antenna 20. The receiving antenna 20 is operable to convert the electromagnetic radiation into usable electrical energy. As such, electrical power can be transmitted from the receiving antenna 12 to the receiving antenna 20. Furthermore, it may be preferred for the transmitting and receiving antennas 12, 20 to be constructed so as to include sufficiently high quality factors (i.e., a Q-factor), such as quality factors of at least 75, at least 100, at least 200, or more than 250.

Figure 6:
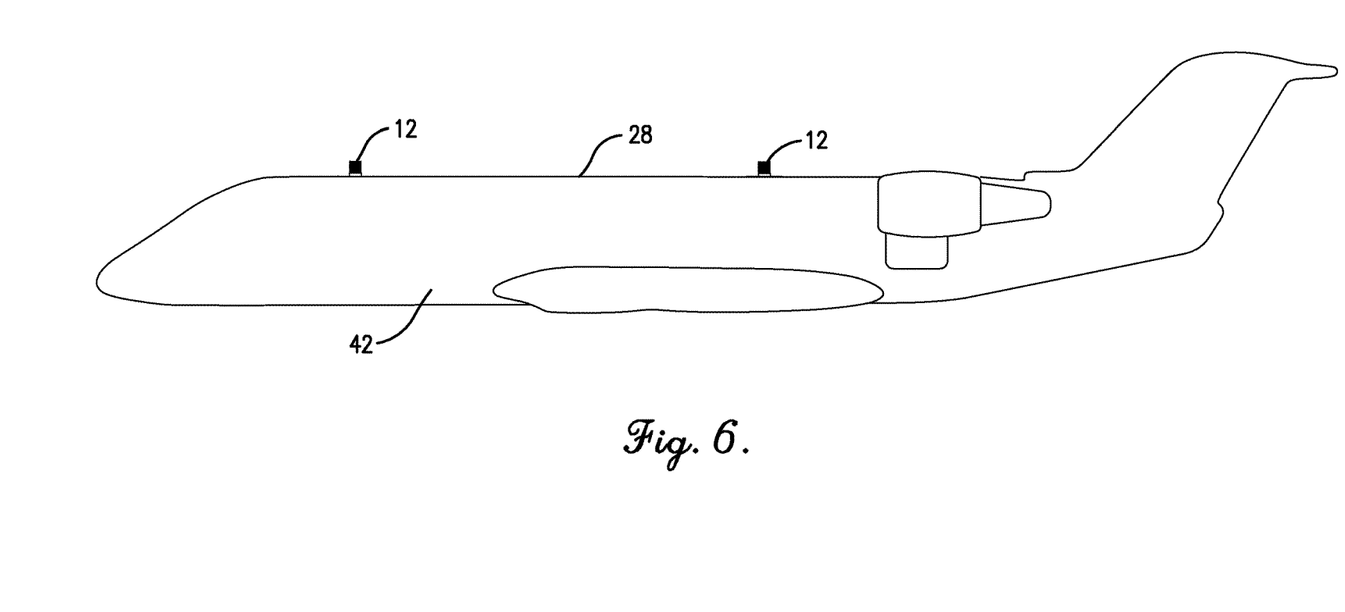
FIG. 6 is an illustration of the wireless power transfer system of FIGS. 1-3 being used to wirelessly transmit power on an exterior of an aircraft according to embodiments of the present invention.

As a specific example, the wireless power transfer system 10, as illustrated in FIGS. 1-3, can be used to wirelessly transmit power in situations where it is feasible to electrically couple the first and second ground planes 18, 26 of the transmitting and receiving antennas 12, 20, respectively. For example, as illustrated in FIG. 6, a transmitting antenna 12 and a receiving antenna 20 may be positioned on an exterior surface of an aircraft 42, with first and second ground planes 18, 26 of the antennas 12, 20 contacting the exterior surface of the aircraft 42. As previously described, the receiving antenna 20 should preferedly be positioned within the non-radiative near field of the transmitting antenna 12. Further, the exterior of the aircraft 42 should be formed form an electrically conductive material, such as aluminum. As such, the first ground plane 18 of the transmitting antenna 12 will be electrically coupled to the second ground plane 26 of the receiving antenna 20. With the first ground plane 18 electrically coupled to the second ground plane 26, the transmitting and receiving antenna's 12, 20 are configured in the configuration of the wireless power transfer system 10. Thus, as an oscillating signal is applied to the transmitting antenna 12, the transmitting antenna 12 is operable to wirelessly transmit power to the receiving antenna 20. Such an implementation of the wireless power transfer system 10 is operable to transmit electrical power without the use of heavy power cables and connectors, so as to reduce weight and space requirements of the aircraft 42.

Similarly, the wireless power transfer system 10 may be employed in other situations to wirelessly transmit power between transmitting and receiving antennas 12, 20, as long as the ground planes 18, 26 of the antennas 12, 20 are electrically coupled. For instance, in an industrial setting, the transmitting and receiving antennas 12, 20 may include a common conductor connecting their ground planes 18, 26, such that the antennas 12, 20 are cable of transferring power to industrial machines and equipment without the need for closely-positioned power sources or power cables. Alternatively, in a classroom or library setting, transmitting and receiving antennas 12, 20 may be connected by an electrically conductive strip. For example, the transmitting antenna 12 may be positioned at a center of a table, and the ground plane 18 of the transmitting antenna 12 may be electrically coupled to the ground planes 26 of one or more receiving antennas 20, via strips of conducting material extending along the table. Each of the one or more receiving antennas 20 may be associated with computing devices (e.g., desktop computers, laptop computers, tablets, etc.), such that the computing devices can receive power from the transmitting antenna 12 without need for a standard 120V AC wall outlet.

Figure 7:
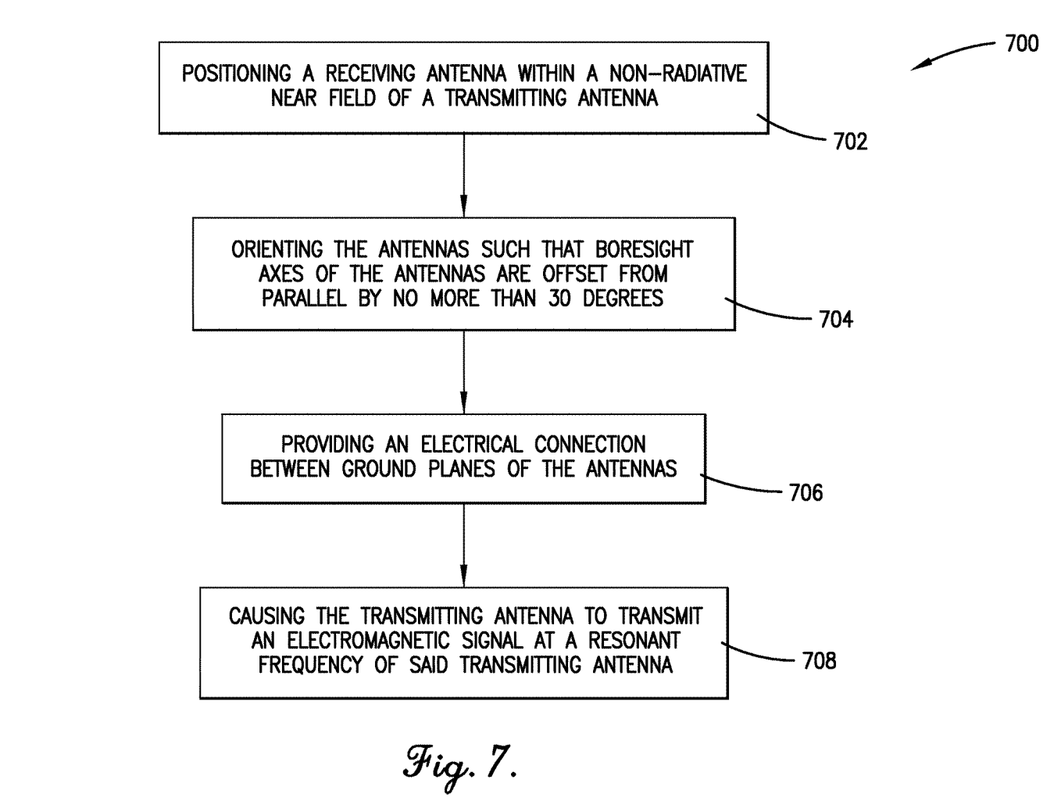
FIG. 7 is a flowchart of a method for wireless transferring power according to embodiments of the present invention.

As such, embodiments of the present invention include a method 700, as illustrated in FIG. 7, of wirelessly transferring electrical power between a transmitting and a receiving antenna 12, 20, with each of the antennas 12, 20 including a conductive helix 14, 22 wound about a helical axis 16, 24 and with each including a ground plane 18, 26. The method 700 includes an initial Step 702 of positioning the receiving antenna 20 within a non-radiative near field of the transmitting antenna 12. A next Step 704 includes orientating the antennas 12, 20 such that the helical axes 16, 24 of the antennas 12, 20 are offset from parallel by no more than 30 degrees. A next Step 706 includes providing an electrical connection between the ground planes 18, 26 of the antennas 12, 20, and a final Step 708 includes causing the transmitting antenna 12 to transmit an electromagnetic signal at a resonant frequency of the transmitting antenna 12.

Figure 8:
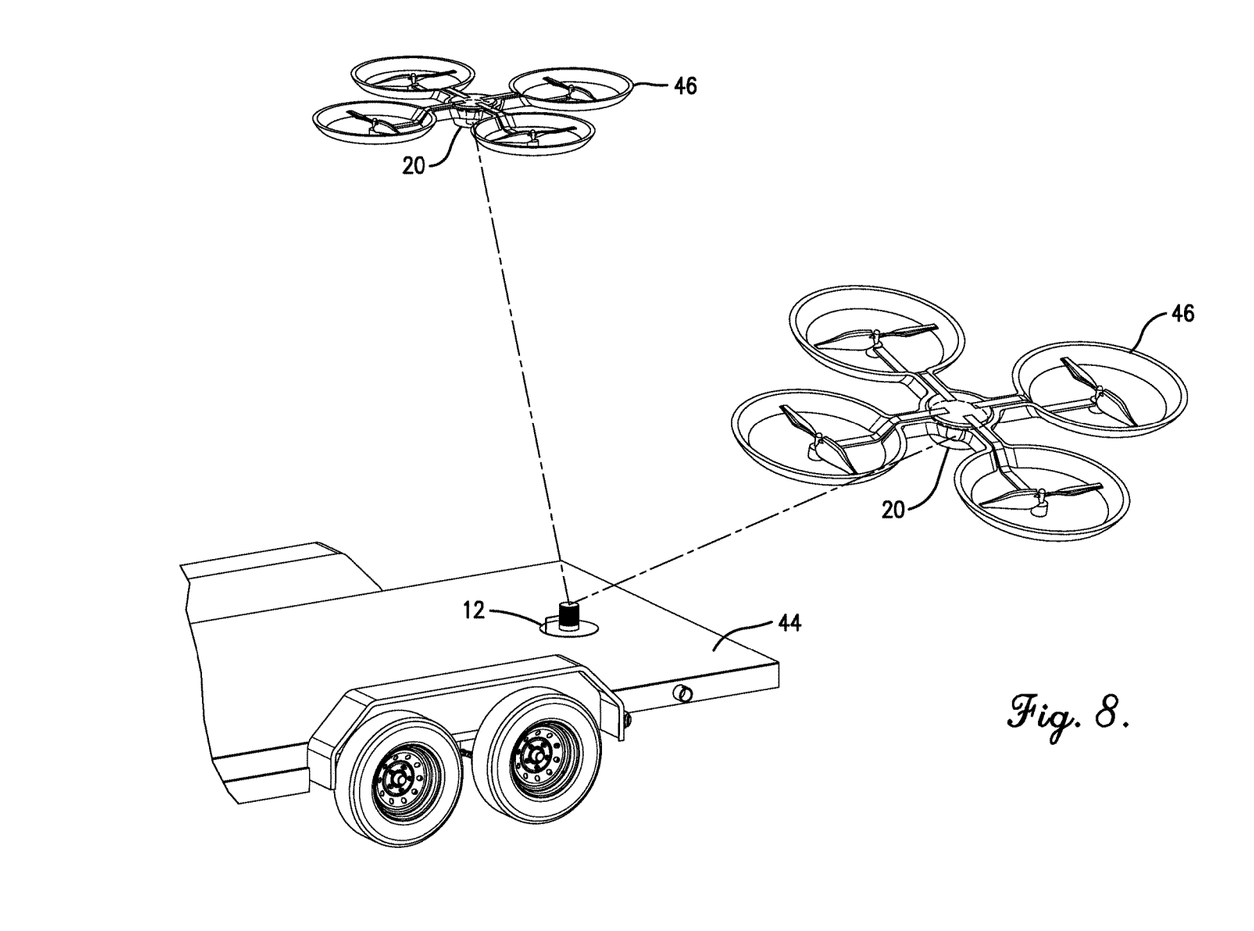
FIG. 8 is an illustration of the additional wireless power transfer system of FIG. 5 being used to wireless charge unmanned aerial vehicles according to embodiments of the present invention.

Alternatively, in instances where it is difficult or impossible to connect the ground planes 18, 26 of transmitting and receiving antennas 12, 20 with a conductive material 28, embodiments provide the transmission of wireless power via the wireless power transmission system 40, as shown in FIG. 5. For example, as illustrated in FIG. 8, a transmitting antenna 12 may be positioned on a platform 44, and one or more receiving antennas 20 may be associated with one or more unmanned aerial vehicles 46 (UAVs). As such, the UAVs 46 can fly within the non-radiative near field of the transmitting antenna 12 to receive power wirelessly from the transmitting antenna 12. In particular, an oscillating electromagnetic input signal will be applied to the transmitting antenna 12, such that the transmitting antenna 12 is operable to wirelessly transmit power to the receiving antennas 20 associated with UAVs 46. Such an implementation of the wireless power transmitting system 40 is operable to transmit electrical power without a direct, physical connection between the platform 44 and the UAVs 46. As such, the UAVs 46 can be recharged "in-flight," without being required to land and to physically connect to a power source.

As a further example of an embodied use of the wireless power transfer system 40, various other types of vehicles or machines may be associated with receiving antennas 20, which are operable to receive power wirelessly from transmitting antennas 12. For example, a car-type vehicle may be configured with a receiving antenna 20, which is operable to receive wireless power from one or more transmitting antennas 12 that are positioned at various locations along roadways. For example, such transmitting antennas 12 may be positioned along road sides, road signs, street lights, or the like. As such, when the car-type vehicle travels along the roadway, it can receive wireless power from the transmitting antennas 12. Such wireless power can supplement the vehicle's standard power source, or, for the case of an electrical vehicle, the wireless power can provide the vehicle's sole source of power. In other embodiment, the vehicles or machines capable of receiving wireless power may include other non-car-type vehicles, such as aircraft, water vessels, trains, robots, or the like.

Thus, embodiments of the present invention provide additional method of wirelessly transferring electrical power between a transmitting antenna 12 and a receiving antenna 20, with each of the antennas 12, 20 including a conductive helix 14, 22 wound about a helical axis 16, 24 and with each including a ground plane 18, 26. The method includes the initial step of positioning the receiving antenna 20 within a non-radiative near field of the transmitting antenna 12. A next step includes orientating the antennas 12, 20 such that the helical axes 16, 24 of the antennas 12, 20 have an angular misalignment of no more than 30 degrees from collinear. A next step includes providing an electrical connection between the conductive helix 14 of the transmitting antenna 12 and the ground plane 18 of the transmitting antenna 12. Next, an electrical connection is provided between the conductive helix 22 of the receiving antenna 20 and the ground plane 26 of the receiving antenna 20. A final step includes causing the transmitting antenna 12 to transmit an electromagnetic signal at a resonant frequency of the transmitting antenna 12.

EXAMPLES

The following examples set forth various exemplary illustrations of wireless power transfer via wireless power transfer systems 10, 40 according to embodiments of the present invention. It is to be understood, however, that these examples are provided by way of illustration and nothing herein should be taken as a limitation upon the overall scope of the invention.

The transmitting antennas 12 and the receiving antennas 20 used in each of the following examples were identically formed, and each included components with the following dimensions: ground plane 18, 26 diameters D2—30 cm; conductive helix 14, 22 heights H1—9.5 cm; conductive helix 14, 22 diameters D1—9 cm; separation distance H2—2.8 cm. Furthermore, the conductive helixes 14, 22 of the transmitting and receiving antennas 12, 20 were formed with 26 right hand turns. As previously described, for given conductive helix 14, 22 heights H1, diameters D1, and numbers of turns, the transmitting and receiving antennas 12, 20 have an optimum resonant frequency. For the following examples, an 18 MHz resonant frequency signal was used. Nevertheless, it is understood that in the event a different frequency resonant signal is required, the number of turns of the conductive helixes 14, 22 can be increased, while keeping all other dimensions unchanged. Similarly, the ground plane 18, 26 diameters D2, conductive helix 14, 22 heights H1, conductive helix 14, 22 diameters D1, and separation distances H2 may all be independently configured, such that the wireless power transfer systems 10, 40 will satisfy any such specific requirements.

As used herein a ratio S11 is defined as a ratio of a reflected voltage to an incident voltage, as measured at the feedpoint 34 of the transmitting antenna 12. An absolute value squared of the ratio S11 (hereinafter, "AVS11") is proportional to a fraction of the electrical power reflected at the feedpoint 34 of the transmitting antenna 12. A value of 0 indicates no reflection, whereas a value of 1 indicates total reflection. In decibels, S11 dB=20*log 10(S11).

Additionally, S21 is defined as a ratio of a voltage obtained at the receiving antenna 20, as measured at the feedpoint 34 of the receiving antenna 20, to the incident voltage at the transmitting antenna 12, as measured at the feedpoint 34 of the transmitting antenna 12. An absolute value squared of the ratio S21 (hereinafter, "AVS21") is proportional to a fraction of the electrical power coupled to the receiving antenna 20. A value of 0 indicates no electrical power coupling, whereas a value of 1 indicates complete power coupling. In decibels, S21 dB=20*log 10(S21).

To determine the efficiency of the wireless power transfer systems 10, 40, a percent efficiency Eff is defined as: Eff=(1−AVS11)*AVS21*100.

Example 1

Wireless Power Transfer System 10 (e.g., FIGS. 1-3)

Power transfer efficiencies Eff were measured between transmitting and receiving antennas 12, 20 positioned in a configuration of the wireless power transfer system 10. Specifically, the transmitting and receiving antennas 12, 20 were separated by a separation distance SD, and each had their helical axes 16, 24 aligned generally in parallel. The following power transfer efficiencies Eff were obtained for the following separation distances SD:

SD of 340 mm: S11 db=−16, S21 dB=−2.4, Eff=56%
SD of 390 mm: S11 db=−14.7, S21 dB=−2.6, Eff=53%;
SD of 440 mm: S11 db=−13.9, S21 dB=−2.7, Eff=51.5%;
SD of 490 mm: S11 db=−11.4, S21 dB=−2.84, Eff=48%;
SD of 540 mm: S11 db=−12.6, S21 dB=−2.8, Eff=49.6%;
SD of 590 mm: S11 db=−11.6, S21 dB=−3, Eff=46.7%;
SD of 640 mm: S11 db=−12, S21 dB=−2.9, Eff=47%;
SD of 690 mm: S11 db=−11.9, S21 dB=−3, Eff=46.9%;
SD of 740 mm: S11 db=−11.6, S21 dB=−3.2, Eff=44.6%;
and
SD of 2520 mm: S11 db=−20.4, S21 dB=−2.4, Eff=57%.

As shown above, the calculated Eff obtained from the separation distance SD of 2520 mm was 57%. Such a wireless power transfer efficiency was obtained at a distance that is more than eight times a magnitude of a largest dimension of the transmitting or receiving antennas 12, 20 (i.e., the ground planes 18, 26 each were configured with a 30 cm diameter D2, which is less than ⅛ of the SD of 2520 mm).

Example 2

Wireless Power Transfer System 40 (e.g., FIG. 5)

The following power transfer efficiencies were measured between transmitting and receiving antennas 12, 20 positioned in a configuration of the wireless power transfer system 40. Specifically, the transmitting and receiving antennas 12, 20 had their helical axes 16, 24 aligned collinearly, with the helical axes 16, 24 being separated by a separation distance SD, and with a 103 cm ground wire being used as the conductive material 28 connecting each of the conductive helixes 14, 22 with their respective ground planes 18, 26:

SD of 1550 mm=S11 db=−10, S21 dB=−4, Eff=36%.

As shown above, the calculated Eff obtained from the separation distance SD of 1550 mm was 36%. Such a wireless power transfer efficiency was obtained at a distance that is more than 5 times a magnitude of a largest dimension of the transmitting or receiving antennas 12, 20 (i.e., the ground planes 18, 26 each were configured with a 30 cm diameter D2, which is less than ⅕ of the SD of 1550 mm).

The following power transfer efficiencies were measured between transmitting and receiving antennas 12, 20 positioned in a configuration of the wireless power transfer system 40. Specifically, the transmitting and receiving antennas 12, 20 had their helical axes 16, 24 aligned collinearly, with the helical axes 16, 24 being separated by a separation distance SD, and with a 56 cm wire being used as the conductive material 28 connecting each of the conductive helixes 14, 22 with their respective ground planes 18, 26:

SD of 1300 mm: S11 db=−7.3, S21 dB=−7.9, Eff=13.198%

SD of 1400 mm: S11 db=−7.7, S21 dB=−6.9, Eff=16.95%;

SD of 1500 mm: S11 db=−8.8, S21 dB=−5.8, Eff=22.835%;

SD of 1600 mm: S11 db=−8.8, S21 dB=−5.8, Eff=22.835%;

SD of 1700 mm: S11 db=−8.1, S21 dB=−6.55, Eff=18.73%;

SD of 1800 mm: S11 db=−8.1, S21 dB=−6.55, Eff=18.73%;

SD of 1900 mm: 511 db=−8.1, S21 dB=−6.5, Eff=18.92%; and

SD of 2000 mm: S11 db=−8.5, S21 dB=−6.4, Eff=19.673%.

Although this invention has been described with its preferred embodiment(s), it is noted that equivalents may be employed and substitutions made herein without departing from the scope of the invention.

We claim:

1. A wireless power transfer system comprising:
   a transmitting antenna including
      a first conductive helix wound about a first boresight axis,
      a first ground plane positioned adjacent to and angled generally orthogonally with said first boresight axis,
      wherein said transmitting antenna is configured to wirelessly transmit electromagnetic radiation;
   a receiving antenna including
      a second conductive helix wound about a second boresight axis,
      a second ground plane positioned adjacent to and angled generally orthogonally with said second boresight axis,
      wherein said receiving antenna is positioned within a non-radiative near field of said transmitting antenna, and wherein said receiving antenna is configured to wirelessly receive electromagnetic radiation transmitted by said transmitting antenna; and
   a conductive material connecting said first ground plane to said second ground plane.

2. The wireless power transfer system of claim 1, wherein said transmitting antenna and said receiving antenna have generally equal resonant frequencies.

3. The wireless power transfer system of claim 1, wherein said non-radiative near field extends no more than a distance of $\lambda/2\pi$ from said transmitting antenna, with $\lambda$, being a resonant wavelength of the transmitting antenna.

4. The wireless power transfer system of claim 1, wherein said first conductive helix of said transmitting antenna has a height, and wherein a feedpoint of an input signal to said transmitting antenna is connected to said transmitting antenna at a position adjacent to a midpoint of the first conductive helix's height.

5. The wireless power transfer system of claim 1, wherein said first boresight axis and said second boresight axis are generally parallel.

6. The wireless power transfer system of claim 1, wherein said first helical antenna is spaced apart from said first ground plane.

7. The wireless power transfer system of claim 1, wherein said first and second ground planes are generally circular in shape and are centered on said first and second boresight axes, respectively.

8. A wireless power transfer system comprising:
   a transmitting antenna including
      a first conductive helix wound about a first boresight axis,
      a first ground plane positioned adjacent to and angled generally orthogonally with said first boresight axis,
      a first conductive material connecting said first conductive helix to said first ground plane,
      wherein said transmitting antenna is configured to wirelessly transmit electromagnetic radiation; and
   a receiving antenna including
      a second conductive helix wound about a second boresight axis,
      a second ground plane positioned adjacent to and angled generally orthogonally with said second boresight axis,
      a second conductive material connecting said second conductive helix to said second ground plane,
      wherein said receiving antenna is positioned within a non-radiative near field of said transmitting antenna, and wherein said receiving antenna is configured to wirelessly receive electromagnetic radiation transmitted by said transmitting antenna.

9. The wireless power transfer system of claim 8, wherein said transmitting antenna and said receiving antenna have generally equal resonant frequencies.

10. The wireless power transfer system of claim 8, wherein said non-radiative near field extends no more than a distance of $\lambda/2\pi$ from said transmitting antenna, with $\lambda$ being a resonant wavelength of said transmitting antenna.

11. The wireless power transfer system of claim 8, wherein said first conductive helix of said transmitting antenna has a height, and wherein a feedpoint of an input signal to said transmitting antenna is located on said first conductive helix at a position adjacent to a midpoint of the first conductive helix's height.

12. The wireless power transfer system of claim 11, wherein said first conductive material is connected to said first conductive helix at said feedpoint.

13. The wireless power transfer system of claim 8, wherein said first boresight axis and said second boresight axis are generally collinear.

14. The wireless power transfer system of claim 8, wherein said first helical antenna is spaced apart from said first ground plane.

15. The wireless power transfer system of claim 8, wherein said first and second ground planes are generally circular in shape and are centered on said first and second boresight axes, respectively.

16. A method of wirelessly transferring electrical power between a transmitting antenna and a receiving antenna, with each of the antennas including a conductive helix wound about a boresight axis and with each including a ground plane, said method comprising the steps of:
   positioning the receiving antenna within a non-radiative near field of the transmitting antenna;
   orientating the antennas such that the boresight axes of the antennas are offset from parallel by no more than 30 degrees;
   providing an electrical connection between the ground planes of the antennas; and
   causing the transmitting antenna to transmit an electromagnetic signal at a resonant frequency of said transmitting antenna, said electromagnetic signal being received by the receiving antenna.

17. The method of claim 16, further including the step of providing a signal input to the transmitting antenna at a feedpoint located adjacent to a midpoint of the transmitting antenna's conductive helix.

18. The method of claim 16, wherein each of said transmitting and receiving antennas is spaced apart from their respective ground planes.

19. A method of wirelessly transferring electrical power between a transmitting antenna and a receiving antenna, with each of the antennas including a conductive helix wound about a boresight axis and with each including a ground plane, said method comprising the steps of:
- positioning the receiving antenna within a non-radiative near field of the transmitting antenna;
- orientating the antennas such that the boresight axes of the antennas have an angular misalignment of no more than 30 degrees from collinear;
- providing an electrical connection between the conductive helix of the transmitting antenna and the ground plane of the transmitting antenna;
- providing an electrical connection between the conductive helix of the receiving antenna and the ground plane of the receiving antenna; and
- causing the transmitting antenna to transmit an electromagnetic signal at a resonant frequency of the transmitting antenna, said electromagnetic signal being received by the receiving antenna.

20. The method of claim 19, further including the step of providing a signal input to the transmitting antenna at a feedpoint located adjacent to a midpoint of the transmitting antenna's conductive helix.

21. The method of claim 19, wherein each of the transmitting and receiving antennas is spaced apart from their respective ground planes.

\* \* \* \* \*